(12) United States Patent
Saylor et al.

(10) Patent No.: US 6,168,127 B1
(45) Date of Patent: Jan. 2, 2001

(54) INFORMATION DISPLAY DEVICE

(75) Inventors: Charles Saylor, Grand Rapids, MI (US); Sheldon Phillips, Thousand Oaks; Edward Mitchell, Los Angeles, both of CA (US)

(73) Assignee: Haworth, Inc., Holland, MI (US)

( * ) Notice: Under 35 U.S.C. 154(b), the term of this patent shall be extended for 0 days.

(21) Appl. No.: 09/324,491

(22) Filed: Jun. 2, 1999

(51) Int. Cl.[7] .................................................. B41J 11/02
(52) U.S. Cl. ........................................ 248/442.2; 248/918
(58) Field of Search .......................... 248/442.2, 441.1, 248/444, 918

(56) References Cited

U.S. PATENT DOCUMENTS

| | | | |
|---|---|---|---|
| 3,330,524 | * 7/1967 | Foley | 248/442.2 |
| 3,476,254 | * 11/1969 | Gaffney | 248/442.2 |
| 4,496,127 | * 1/1985 | Nelson | 248/441.1 |
| 5,035,392 | * 7/1991 | Gross et al. | 248/442.2 |
| 5,328,145 | * 7/1994 | Charapich | 248/442.2 |
| 5,398,905 | * 3/1995 | Hinson | 248/442.2 |
| 5,769,378 | * 6/1998 | Correa | 248/442.2 |
| 5,988,582 | * 11/1999 | Olivo | 248/442.2 |

* cited by examiner

Primary Examiner—Anita M. King
Assistant Examiner—Jerome A. DeLuca
(74) Attorney, Agent, or Firm—Flynn, Thiel, Boutell & Tanis, P.C.

(57) ABSTRACT

An information display device for use in conjunction with a computer monitor including a front display board having a surface capable of being written upon with ink markers of the erasable type, and a rear support arrangement which supports the information display device atop a computer monitor or other surface. The information display device also includes a message arm which is extendible from either side of the device from a channel formed within the interior thereof. The smooth front surface of the message arm is particularly useful for displaying self-adhesive type message notes in a location convenient to the worker. The information display device additionally defines front and rear shallow troughs for storing work-related items therein.

20 Claims, 5 Drawing Sheets

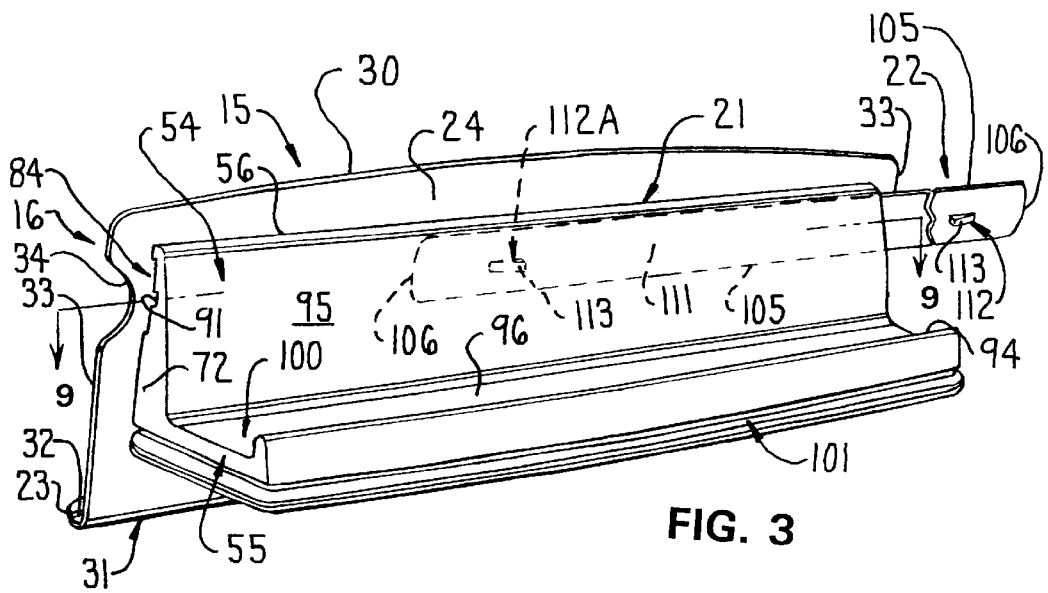
FIG. 3
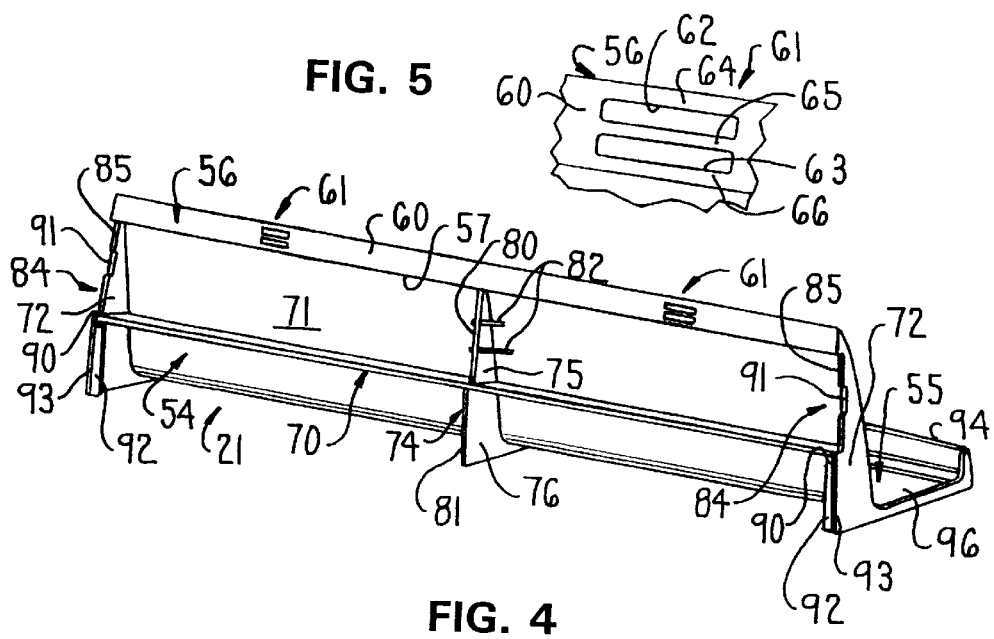
FIG. 5
FIG. 4

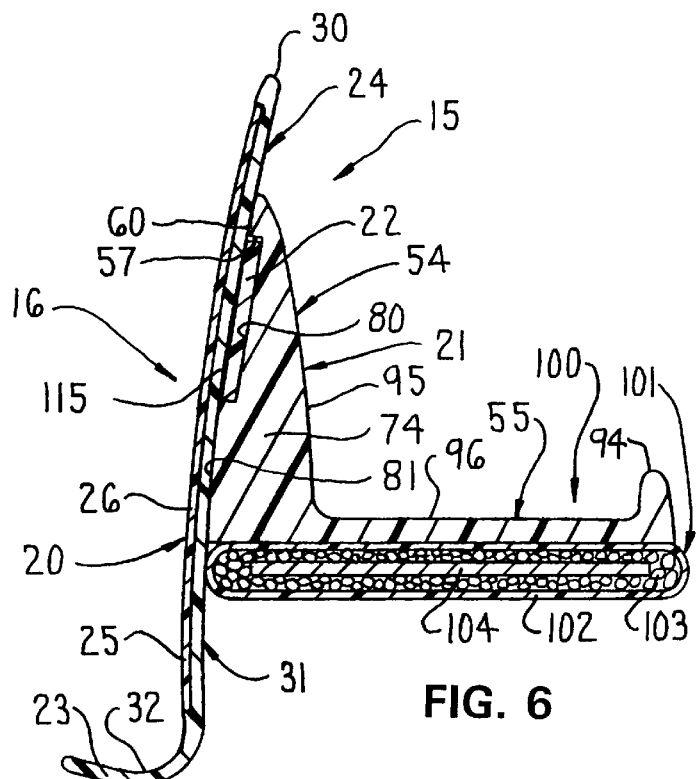
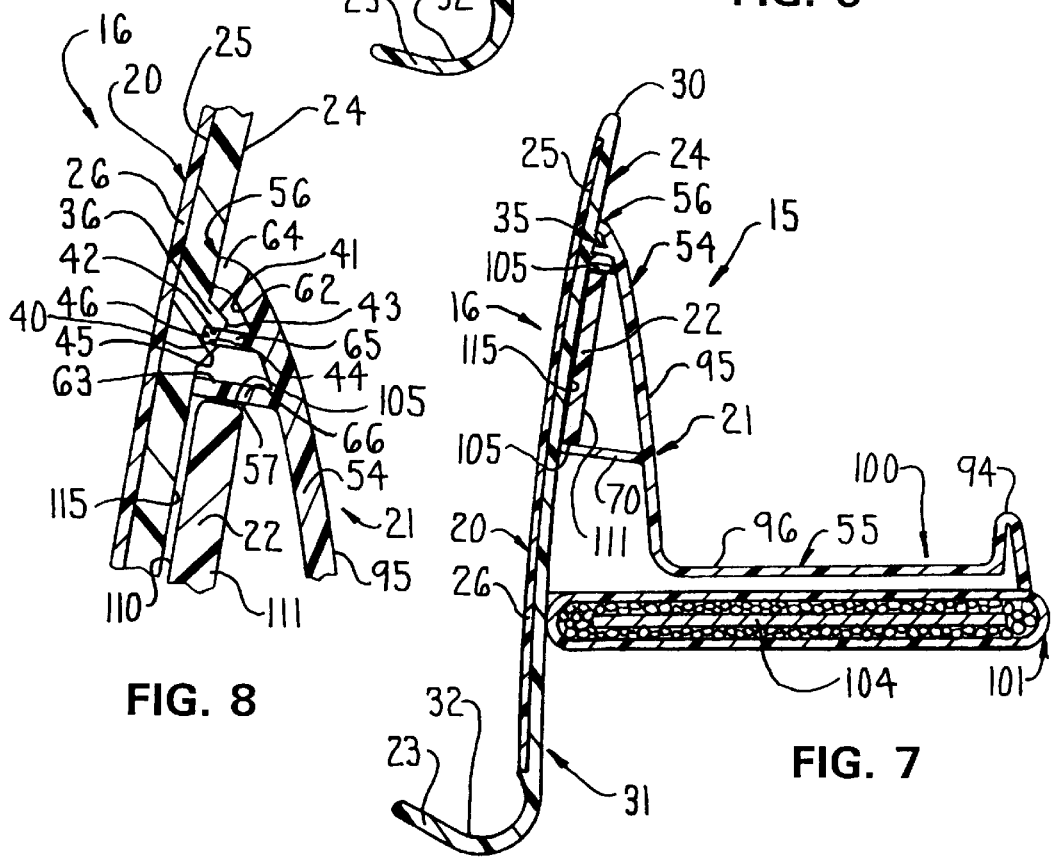
FIG. 6
FIG. 8
FIG. 7

INFORMATION DISPLAY DEVICE

FIELD OF THE INVENTION

This invention relates to an information display device for use in an office-type environment and, more particularly, to an improved device supportable on an object having a cornered configuration, such as a computer monitor or shelf, which is adapted to display information and store work-related accessories in a location convenient to the user.

BACKGROUND OF THE INVENTION

The modern office worker often utilizes a computer to handle the various tasks and demands of a typical work day, which necessarily results in the worker spending a significant amount of time in front of a computer. The particular area in which the computer is located in the work area is therefore an advantageous location for the placement of various types of work-related objects and accessories frequently utilized by the worker, such as writing pads, daily planners, writing instruments, etc. Further, the configuration of the typical computer monitor in combination with the large amount of time the worker spends looking at the display screen thereof often results in the placement of self-adhesive reminder notes around the picture-frame type portion of the monitor. Thus, the numerous work-related accessories of the type mentioned above as utilized by the office worker significantly contributes to the overall clutter and crowdedness of the work area, and often results in inefficient use of valuable space in a work area.

It is therefore an object of this invention to provide an improved information display device disposed which in one embodiment may be used in conjunction with a computer monitor, and which makes efficient use of space above the monitor for the display of information and placement of message notes, and also provides a convenient location for storing items such as writing instruments, paper clips, etc. If desirable or necessary, depending upon the particular arrangement of the work area, the information display device according to the invention may alternatively be supported on virtually any office component having a corner, such as on the front or side edge of a shelf, the front or side edge of a table or desk, or on an inside window ledge or sill.

The invention relates to an information display device for use with an object having a generally horizontal surface and a side surface which together define a corner configuration. The display device includes an upright front display member defining thereon a forwardly facing surface for displaying information, a rear support member disposed at a rearwardly facing surface of the front display member and therewith defining an interior channel which opens sidewardly adjacent an upright side edge of the front display member. The rear support member has a lower end configured for engagement with the top surface of the object, and the front display member has a lower portion which projects downwardly beyond the lower end of the rear support member so as to lie closely adjacent the side surface of the object. The display device also includes an elongate arm slidably disposed in the channel and slidably extendible outwardly from the channel into an extended cantilevered position. The arm has a front surface configured for posting information such as message notes thereon in the extended position.

The invention additionally relates to an office accessory supportable atop a generally horizontal surface. The accessory includes a generally upright display member defining thereon a forwardly facing and generally flat surface for displaying information thereon. The accessory also includes a support member which projects rearwardly from the display member and has a lower end configured for engagement with the flat surface. The lower end of the support member is weighted for stably positioning the accessory on the flat surface, and an elongate arm is slidably disposed within an interior of the accessory and is extendible outwardly therefrom into an extended position for posting information on a front surface thereof.

The desirable constructional and functional features of the present invention, as well as other operational advantages thereof, will be apparent upon reading the following specification and inspecting the accompanying drawings.

BRIEF DESCRIPTION OF THE DRAWINGS

FIG. 3 is a rear perspective view of the information display device;

FIG. 4 is a perspective view of the rear support member of the information display device;

FIG. 5 is an enlarged, fragmentary detailed view of the connectors shown in FIG. 4;

FIG. 6 is a cross-sectional view taken generally along line 6—6 in FIG. 1;

FIG. 7 is a cross-sectional view taken generally along lines 7—7 in FIG. 1;

FIG. 8 is an enlarged, fragmentary, detailed view of the connection between the front display board and the rear support member as shown in FIG. 7;

Figure 1:
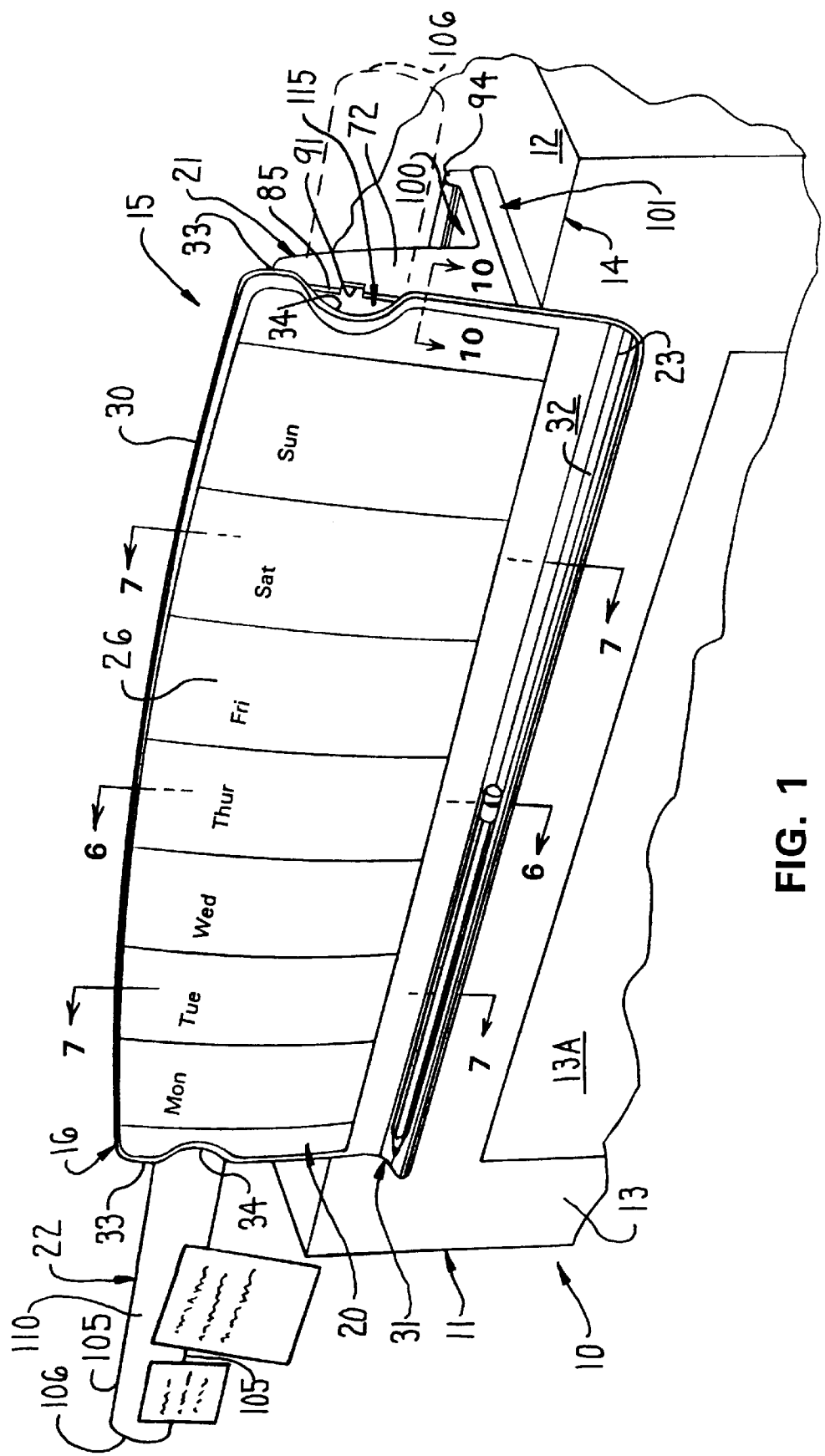
FIG. 1 is a perspective view which illustrates a fragment of a computer monitor upon which an information display device according to the invention is supported.

Certain terminology will be used in the following description for convenience in reference only, and will not be limiting. For example, the words "upwardly", "downwardly", "rightwardly", and "leftwardly", will refer to directions in the drawings to which reference is made. The word "front" will be used to refer to the side of the computer monitor which is typically closest to the worker, and the word "rear" will be used to refer to the side which is remote from the worker. Further, the word "front" when used in relation to the information display device will be used to refer to the side thereof which is typically closest to the worker, and the word "rear" will be used to refer to the side thereof which is remote from the user. The words "inwardly" and "outwardly" will refer to directions toward and away from the geometric center of the general arrangement or specific parts thereof. Said terminology will include the words specifically mentioned, derivatives thereof, and words of similar import.

DETAILED DESCRIPTION

Figure 2:
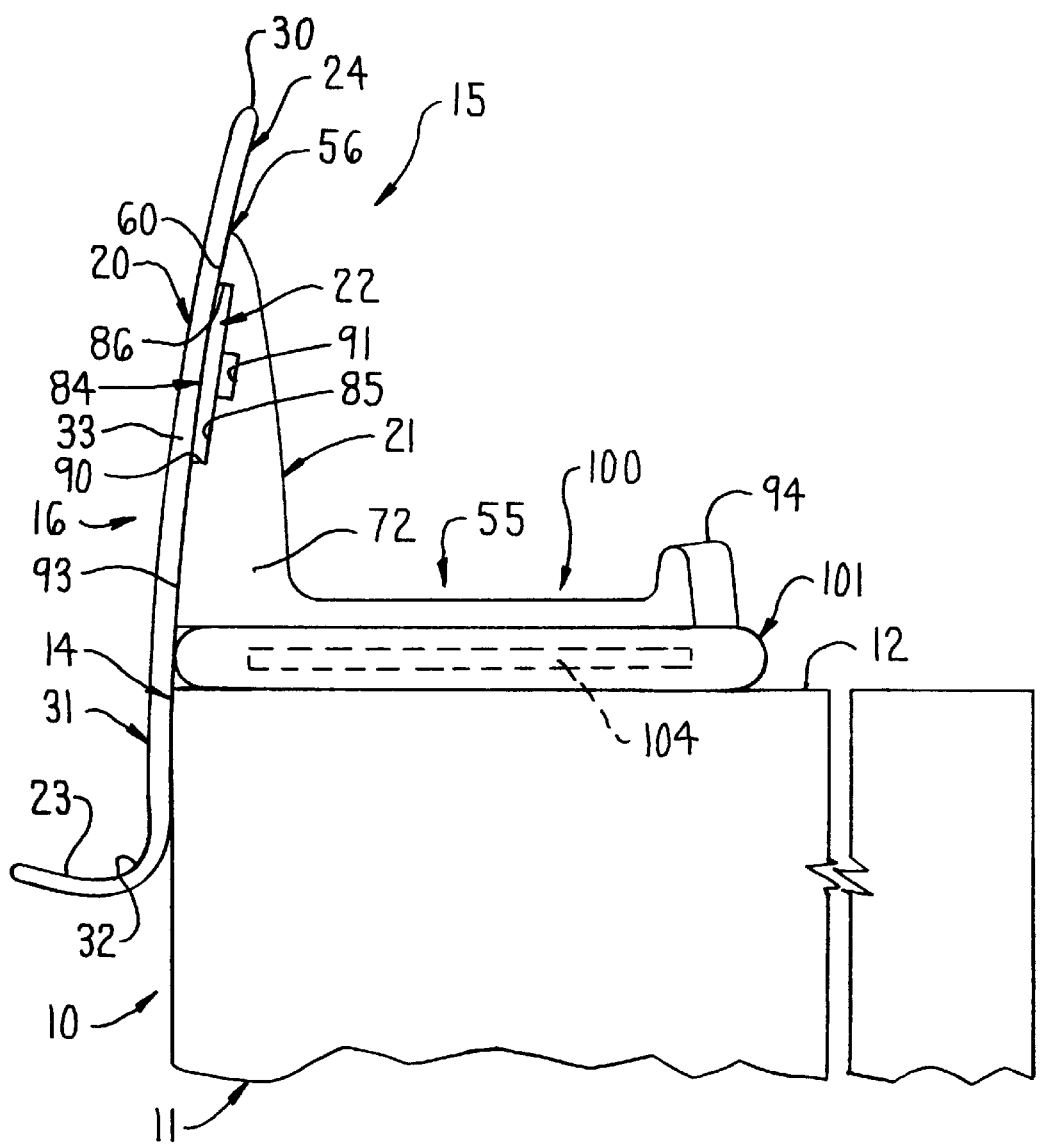
FIG. 2 is a fragmentary, end elevator,al view of the information display device disposed atop the computer monitor.

Referring to the drawings, and specifically FIGS. 1 and 2, there is illustrated a fragment of a typical computer monitor 10. Monitor 10 includes a housing 11 which defines an upper generally flat surface 12 and a frontwardly facing frame-like portion 13 which surrounds a display screen 13A. The upper surface 12 and the frame-like portion 13 are generally perpendicular to one another so as to define a front corner 14 of the monitor 10. Supported on this front corner 14 of the monitor 10 is an information display device 15 according to the invention. The information display device 15 includes an upright front display board 16 having a front surface 20 for displaying information, a rear support member 21 which engages upper surface 12, and an extendible and retractable message arm 22 which is slidable outwardly from either side of front display board 16.

The front display board 16 defines thereon generally flat front and rear surfaces 20 and 24 which face away from one another. Front surface 20 defines therein a shallow, frontwardly opening recess 25 (FIGS. 6 and 7) which extends across substantially the entire lengthwise extent of front surface 20. A label 26 is located and secured within recess 25, for example by adhesive. Label 26 has a smooth (i.e. marker board) surface capable of being written upon with erasable-type marking pens. Further, in the illustrated embodiment, label. 26 is divided into seven sections each including a day-of-the-week designation, so that the user can conveniently record daily tasks, appointments, etc. in the appropriate day section. The information written upon the label 26 can then be erased when no longer needed, so that new information can be displayed thereon.

Front display board 16 has an upper terminal edge 30 having a slightly upwardly arcuate configuration, and a lower portion 31 which projects downwardly from adjacent a lowermost edge of label 26 and then curves outwardly and away from label 26 as it projects slightly upwardly relative to the horizontal to define a ledge or lip 23. The ledge 23 extends across the entire lengthwise extent of front display board 16 and defines therein a shallow, upwardly opening, elongate trough 32 for storing writing instruments or other items as shown in FIG. 1. Front display board 16 additionally includes a pair of generally upright side edges 33 extending between upper edge 30 and ledge 23. Each upright side edge 33 defines therein a concave recess 34 spaced slightly downwardly from upper edge 30. As shown in FIG. 1, the side edges of recess 25 and label 26 are recessed inwardly so as to conform to the shape of each of the recesses 34.

Rear surface 24 of front display board 16, as shown in FIGS. 7 and 8, includes thereon a pair of identical connector elements 35 spaced horizontally from one another and located slightly downwardly from upper edge 30. Connector elements 35 in the illustrated embodiment include rearwardly projecting and horizontally extending upper and lower ribs 36 and 40 which are substantially parallel to one another. Upper rib 36 has a downwardly slanted top surface 41 and a straight bottom surface 42 which adjoin one another at a flat front surface 43. Lower rib 40 has a flat upper surface 44 generally parallel to bottom surface 42 of upper rib 36, and a lower surface 45 which angles upwardly as it projects outwardly from rear surface 24 until it merges with upper surface 44. Bottom surface 42 and upper surface 44 define therebetween a generally horizontally extending slot or groove 46.

Figure 10:
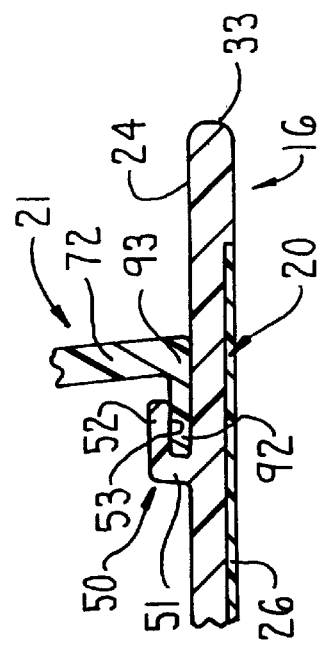
FIG. 10 is a cross-sectional view taken generally along line 10—10 in FIG. 1.

Front display board 16 also includes a pair of guides 50 disposed adjacent each side edge 33 thereof, only one of which is shown in FIG. 10. Guides 50 are L-shaped and each has a front leg 51 which projects rearwardly from rear surface 24 and a rear leg 52 connected to an outer end of front leg 51. Each rear leg 52 projects toward the respective side edge 33 and is spaced horizontally from and generally parallel with rear surface 24 to define a sidewardly opening and substantially upright elongate channel 53.

With reference to FIGS. 3 and 4, rear support member 21 includes an upright wall 54 connected at a lower end thereof to a horizontally extending base wall 55. Upright wall 54, as it projects upwardly from base wall 55, curves slightly forwardly as best shown in FIG. 7. Upright wall 54 terminates at an uppermost edge portion 56 having a generally planar frontwardly facing surface 60 which extends along the entire lengthwise extent of rear support member 21, and a downwardly facing surface 57 generally perpendicular to front surface 60. Rear support member 21 is provided with a pair of connectors 61 spaced horizontally from one another along edge portion 56, as shown in FIG. 4, by an amount substantially equal to the horizontal distance between connector elements 35 of front display board 16. Connectors 61 each include a pair of substantially horizontally extending, frontwardly opening upper and lower channels 62 and 63 (FIG. 5) formed in surface 60 which are defined by top, intermediate and bottom wall sections 64, 65 and 66 of uppermost edge portion 56. More specifically, upper channel 62 is defined between top wall section 64 and intermediate wall section 65, and lower channel 63 is defined between intermediate wall section 65 and bottom wall section 66. Intermediate wall section 65 has a thickness (as measured in a top to bottom direction of rear support member 21) similar to the height dimension of groove 46 formed in front display board 16 for a purpose as discussed below.

Referring to FIG. 4, rear support member 21 has a shelf-like partition 70 located beneath uppermost edge portion 56 and has an upper surface generally parallel to surface 57 thereof. Partition 70 projects horizontally forwardly from an inner surface 71 of upright. wall 54 and extends along substantially the entire lengthwise extent of rear support member 21. Rear support member 21 also has a pair of generally L-shaped upright end walls 72 connected to opposite ends of the upright and base walls 54 and 55 and partition 70. A center wall 74 similar in shape to end walls 72 is located therebetween and has an upper wall part 75 which extends between uppermost edge portion 56 and partition 70, and a lower wall part 76 which extends downwardly from a lower surface of partition 70. The forwardmost edge 80 of upper wall part 75 is offset a small distance rearwardly relative to the front edge 81 of lower wall part 76. As illustrated in FIG. 4, center wall 74 may be provided with a pair of reinforcing members 82 which extend between upper wall part 75 and inner surface 71 of upright wall 54. End walls 72 and center wall 74 project forwardly from upright wall 54 to provide rear support member 21 with a frontwardly opening, generally hollow interior.

End walls 72 each define therein a rearwardly projecting generally rectangular recess 84 (FIGS. 2 and 4). The upright edges 85 of the end walls 72 defining the rear extent of each recess 84 and forwardmost edge 80 of center wall 74 all lie within a common plane. Further, the edges 86 of end walls 72 defining the upper extent of each recess 84 and downwardly facing surface 57 of uppermost edge portion 56 lie within a common plane. The edges 90 of end walls 72 defining the lower extent of each recess 84 are flush with the upper surface of partition 70. As best shown in FIG. 2, the upright edges 85 of end walls 72 have rearwardly projecting small notches 91 which open forwardly into the respective recess 84.

Referring to FIGS. 4 and 10, each end wall 72 includes a flange 92 which projects inwardly from the forwardmost edge 93 thereof in a generally perpendicular manner. In the illustrated embodiment, flanges 92 extend upwardly from a lowermost portion of the respective edge 93 and terminate slightly below partition 70. Each flange 92 preferably has a thickness similar to the width of channel 53 of front display board 16.

Base wall 55 of rear support member 21 projects horizontally rearwardly from upright wall 54 and terminates at an upwardly projecting lip or flange 94. In this regard, in the illustrated embodiment, the rearward terminal edge portion of base wall 55 bends upwardly and then back downwardly over upon itself to form flange 94 (FIG. 7). The rear surface 95 of upright wall 54, the upper surface 96 of base wall 55, and the lip 94 together define a shallow trough 100 which can be utilized for storing work-related items such as writing utensils, paper clips, ink-marker eraser, etc.

Referring now to FIGS. 3, 6 and 7, the rear support member 21 mounts thereon a weighted pouch 101, and in the illustrated embodiment the weighted pouch is a bean bag. Pouch 101 includes a thin outer covering 102 which confines therein a filler material 103 such as dried beans or other relatively dense small pieces of material. As shown in FIGS. 6 and 7, an elongate bar 104, preferably of metal, is located within Covering 102 so as to increase the weight of pouch 101. The pouch 101 is securely attached to the underside of rear support member 21 and serves to stably position the information display device 15 atop a computer monitor 10 or other object. Pouch 101 may be attached to the underside of rear support member 21 with an appropriate fastener (not shown), for example, hook-and-loop type fasteners commonly sold under the name VELCRO®. Alternatively, pouch 101 may be secured to rear support member 21 with adhesive, clips or other fasteners. It will be appreciated that other types of weighted members may be utilized in place of pouch 101. For example, a flexible pouch containing therein relatively dense gel may be utilized, and may have an outer covering constructed of neoprene.

Figure 9:
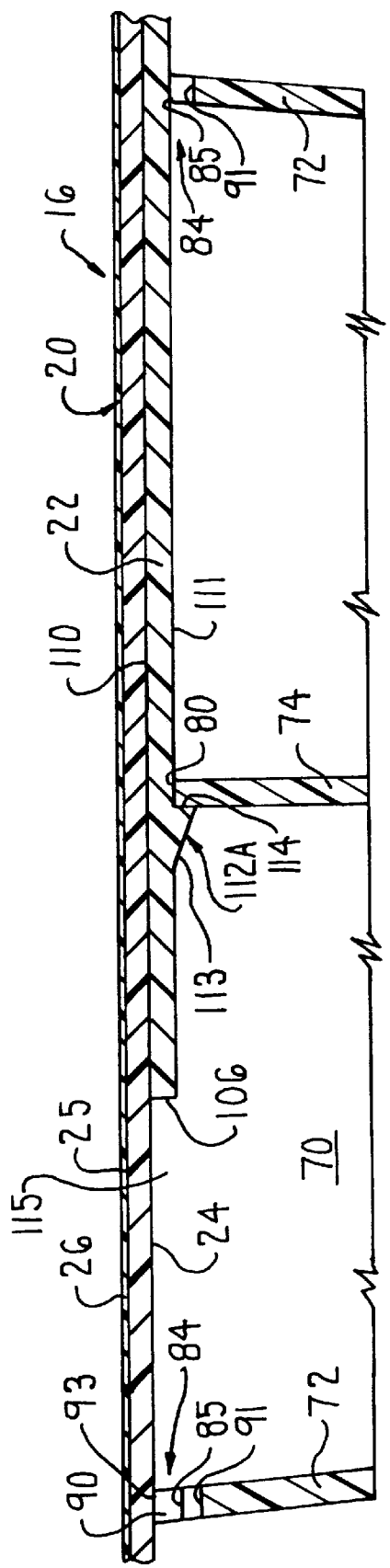
FIG. 9 is a cross-sectional view taken generally along line 9—9 in FIG. 3.

Referring now to FIGS. 3 and 8, message arm 22 has an elongated shape defined by upper and lower longitudinal edges 105 and convexly curved side edges 106 which extend between the respective longitudinal edges 105. Message arm 22 also includes generally smooth front and rear surfaces 110 and 111 which face away from each other. A pair of wedge-shaped stops 112 and 112A project from rear surface 111 (FIG. 3) and are spaced inwardly a short distance from the respective side edges 106 of arm 22. Each stop 112 and 112A defines thereon a rearwardly facing ramped surface 113 (FIG. 9) which angles rearwardly as it projects inwardly away from the respective side edge 106, and a generally vertically oriented and flat stop surface 114 extends between rear surface 111 of arm 22 and the outer edge of the respective ramped surface 113. As shown in FIG. 9, stop surface 114 is generally perpendicular to rear surface 111.

To assemble the information display device 15, the rear support member 21 is positioned above front display board 16 so that the flanges 92 are aligned with the channels 53 of the respective guides 50 of front display board 16. This alignment of flanges 92 with channels 53 also serves to vertically align rear support member connectors 61 with the respective connector elements 35 of front display board 16. The rear support member 21 is then slid downwardly relative to front display board 16 to engage the flanges 92 within the respective channels 53 (FIG. 9). As the rear support member 21 is moved downwardly, first the bottom wall section 66 and then the intermediate wall section 65 (FIG. 8) of each connector 61 rides downwardly over the respective upper ribs 36. Due to the angled configuration (i.e. angled surface 41) of the upper ribs 36, the upright wall 54 and wall sections 65 and 66 of rear support member 21 are deflected slightly rearwardly relative to rear surface 24 of front display board 16. Once intermediate wall section 65 passes over the respective upper rib 36, the front edge of wall section 65 snaps into groove 46 and forms an interference-type connection between front display board 16 and rear support member 21, and the flanges 92 are fully inserted into their respective channels 53.

The engagement of the intermediate wall sections 65 within the respective grooves 46 effectively prevents vertical movement of the rear display member 21 and front display board 16 relative to one another, and the engagement of flanges 92 within the respective channels 53 prevents horizontal movement of rear display member 21 and front display board 16 relative to one another. The weighted member or bean bag 101 can then be attached to the underside of rear display member 21, or alternatively may be attached to rear display member 21 prior to mounting same on front display board 16. In the assembled condition of the information display device 15, the lower portion 31 including ledge 23 of front display board 16 projects downwardly beyond the lower end of bean bag 101 (FIG. 2), and in the illustrated embodiment defines approximately a right angle therewith. In addition, the forwardmost edges 93 of end walls 72 abut the lower portion of rear surface 24 of front display board 16, and likewise the front surface 60 of the rear support member upper edge portion 56 abuts an upper portion of rear surface 24.

With the rear support member 21 secured to the front display board 16, these two components together define a generally horizontally oriented and elongate channel 115 for receiving message arm 22 (FIGS. 8 and 9). The shelf-like partition 70 of rear display member 21 defines the lowermost extent of channel 115, the rear extent of the channel 115 is defined by the forward edge 80 of center wall 74 and the end edges 85 of the respective end walls 72, the top extent of the channel 115 is defined by the downwardly facing surface 57 of upper edge portion 56, and the front extent of the channel 115 is defined by the rear surface 24 of front display board 16. The recesses 84 of the respective end walls 72 of rear support member 21 define sidewardly oriented access openings into channel 115 (FIG. 2).

To assemble the message arm 22 onto the device 15, the message arm 22 is inserted into channel 115 via one of the recesses or access openings 84 located on either side of the device 15 with the stops 112 oriented rearwardly. For example, with reference to FIGS. 3 and 9, the right end of the message arm 22 is inserted into the left access opening 84 of channel 115. In this regard, the notch 91 of left opening 84 allows the rightmost stop 112 to pass through opening 84 unobstructed. As the right end of message arm 22 is moved further into channel 115, the ramped surface 113 of stop 112 allows same to pass over the forward edge 80 of center wall 74, and in the process causes a slight rearward deflection of the latter relative to front display board 16. Once the stop 112 clears the center wall 74, the center wall 74 resiliently returns to its original position and the message arm 22 is now locked into place within channel 115. The inwardly facing flat stop surfaces 114 of the respective stops 112, 112A prevent the removal of the message arm 22 from channel 115. For example, with reference again to FIGS. 3 and 9, if an attempt is made to move the message arm 22 further to the right in FIG. 3, the stop surface 114 of the leftmost stop 112A abuts the left side of the center wall 74 (FIG. 9). Likewise, if an attempt is made to remove the message arm 22 from channel 115 through the left access opening 84 in FIG. 9, the stop surface 114 of the rightmost stop 112 will abut the right or opposite side of center wall 74.

The length of the message arm 22 is similar to the length of the front display board 16 as measured horizontally between the upright side edges 33 thereof so that the convex side edges 106 of message arm 22 are graspable via the respective concave recesses 34 (which recesses 34 are vertically aligned with and in superimposed relation to channel 115) located on the opposite sides of the front display board 16. This length of the message arm 22 also ensures that one end thereof is always exposed or outside channel 115 to enable manipulation of the message arm 22, so that same is extendible from either side of the information display unit 15 (as shown in solid lines on the left in FIG. 1, and in dotted lines on the right in FIG. 1).

In use, with reference to FIGS. 1 and 2, the information display device 15 according to the invention is placed upon the upper surface 12 of monitor 10 and slid rearwardly until the rear surface 24 of front display board 16 lies closely adjacent frame-like portion 13. The information display device 15 is thus stably positioned on the front corner 14 of monitor 10. In this regard, if top surface 12 of monitor 10 has a slightly slanted or irregular contour, bean bag 101 will conform to same. The writable surface 20 of front display board 16 may be utilized as a daily calendar for appointments, deadlines, etc., and work-related articles such as writing instruments may be stored within front trough 32 or rear trough 100. As best shown in FIG. 2, the front display board 16 angles slightly rearwardly as it projects upwardly from lower portion 31 thereof to provide improved visual access to the information displayed thereon. Message arm 22 may be manipulated as discussed above and pulled outwardly from the interior of the device 15, for example as shown in FIG. 1, and notes having adhesive on the rear side thereof may be removably attached to the smooth front surface 110 of arm 22 for convenient display.

It will be appreciated that the marker board surface 20 of front display board 16 may be replaced with another type of surface such as a conventional layer of cork usable with pins or tacks for posting information thereon. Further, the day designations featured on surface 20 may be replaced with a blank surface so that any type of information can be written thereon and displayed, or alternatively may be replaced with a conventional monthly calendar or other scheduling tool.

It will also be appreciated that the information display device 15 according to the invention need not necessarily be utilized with a computer monitor, and may instead be supported on an object having a corner such as a shelf, a computer printer, window ledge, etc. Further, if desired, the lower portion 31 of front display board 16 may be eliminated so that the lowermost edge of front display board 16 is generally flush with the weighted member 101 such that the device 15 is supportable atop a worksurface such as a table or other generally horizontal surface.

Front display board 16, rear support member 21 and message arm 22 may be constructed of lightweight material such as plastic, and in the illustrated embodiment are constructed of ABS, PP, and HDPE and are formed by injection molding. Label 26 in the illustrated embodiment is constructed of vinyl and is diecut.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A free standing information display device for use with an object having a generally horizontal surface and a side surface which together define a corner configuration, said device comprising:

an upright front display member defining thereon a forwardly facing and generally flat surface for displaying information thereon;

a rear support member fixed to a rearwardly facing surface of said front display member and therewith defining an interior channel which opens sidewardly adjacent an upright side edge of said front display member, said rear support member having a lower end configured for engagement with the horizontal surface of the object, said front display member having a lower portion which projects downwardly beyond said lower end of said rear support member so as to lie adjacent the side surface of the object; and an elongate arm slidably disposed in said channel and slidably extendible outwardly from said interior channel into an extended cantilevered position, said arm having a front surface for posting information such as message notes thereon in said extended position of said arm.

2. The device of claim 1 wherein said front display member has a pair of upright side edges and said channel opens sidewardly adjacent each said upright side edge such that said arm is slidably extendible from adjacent either of said upright side edges of said front display member.

3. The device of claim 2 wherein each said side edge of said front display member defines therein a recess vertically aligned with said channel to enable gripping of a terminal end portion of said arm for manipulation thereof.

4. The device of claim 1 wherein said forwardly facing surface of said front display member is constructed of a material capable of being written upon with ink markers of the erasable type, and said front surface of said arm is smooth such that self-adhesive notes are positionable thereon.

5. The device of claim 1 wherein said lower portion of said front display member curves upwardly to define an upwardly opening shallow trough for storing objects therein.

6. The device of claim 1 wherein said arm includes at least one stop which cooperates with a stop member disposed closely adjacent a portion of said interior channel to prevent removal of said arm therefrom.

7. The device of claim 6 wherein said front display member has a pair of upright side edges and said channel opens sidewardly adjacent each said upright side edge such that said arm is slidably extendible from adjacent either of said upright side edges, a pair of stops project rearwardly from a rear surface of said arm opposite said front surface thereof and are horizontally spaced from one another along said arm, said rear support member includes a generally upright wall which projects forwardly toward said rearwardly facing surface of said front display member, and a forward edge of said wall defines said stop member and is disposed between said pair of stops to limit outward extension of said arm from adjacent said upright side edges.

8. The device of claim 1 wherein said rear support member defines an upwardly opening shallow trough for storing objects therein.

9. The device of claim 1 wherein said lower end of said support member mounts thereon a weighted member which engages the horizontal surface of the object for stably positioning said device thereon.

10. The device of claim 1 wherein said front display member angles away from the user as it projects upwardly.

11. A free standing office accessory supportable atop a generally horizontal surface, said accessory comprising:

a generally upright display member defining thereon a forwardly facing and generally flat surface for displaying information thereon;

a support member projecting rearwardly from said display member, said support member having a lower end configured for engagement with the horizontal surface, said lower end being weighted for stably positioning said accessory on the horizontal surface; and an elongate arm slidably disposed within an interior of said accessory and being extendible outwardly therefrom into an extended position for posting information on a front surface thereof.

12. The accessory of claim 11 wherein said upright display member includes an upwardly curved lower edge portion defining an upwardly opening trough for storing objects therein.

13. The accessory of claim 12 wherein said support member has a generally upright wall portion and a generally horizontal base portion which projects rearwardly from a lower end of said upright wall portion to provide said support member with a generally L-shaped transverse cross-section.

14. The accessory of claim 13 wherein said base portion of said support member includes a flange which projects upwardly from a rear terminal edge thereof, said flange and a rearwardly facing surface of said upright wall portion together defining an upwardly opening shallow trough for storing objects therein.

15. The accessory of claim 11 wherein said support member has an upper edge portion which abuts a rear surface of said display member, said upper edge portion and said rear surface of said display member having cooperating connector elements for securing said support member and said display member to one another.

16. The accessory of claim 15 wherein said connector element of one of said members includes upper and lower generally horizontally extending ribs which define therebetween a generally horizontally extending groove, said connector element of the other member includes upper and lower horizontally extending channels separated from one another by a generally horizontally extending wall section, said upper and lower ribs being respectively engaged within said upper and lower channels and said wall section being engaged within said groove to prevent vertical displacement of said support member and said display member relative to one another.

17. The accessory of claim 15 wherein said cooperating connector elements of said display member and said support member prevent vertical displacement of said support member and said display member relative to one another, said display member includes a pair of guides horizontally spaced from one another along said rear surface thereof, each said guide defining a sidewardly and outwardly opening channel, and said support member includes a pair of flanges which project inwardly toward one another from respective upright opposite end walls of said support member and into the respective channels of said display member to prevent horizontal displacement of said support member and said display member relative to one another.

18. The accessory of claim 11 wherein said lower end of said support member mounts thereon a flexible pouch containing therein a dense filler material for stably positioning said accessory on the horizontal surface.

19. The accessory of claim 11 wherein said support member is secured to a rear surface of said display member and therewith defines a generally horizontally extending elongate channel within said interior, said arm being slidably disposed within said channel and being extendible outwardly so as to project outwardly from at least one upright side edge of said front display member.

20. The accessory of claim 19 wherein said support member mounts thereon a generally horizontally extending shelf-like wall for supporting said arm thereon, said shelf-like wall being disposed within said interior and defining a portion of said channel.

* * * * *